US008422597B2

(12) United States Patent
Seo

(10) Patent No.: US 8,422,597 B2
(45) Date of Patent: Apr. 16, 2013

(54) METHOD FOR PROCESSING RECEIVED SIGNAL BY APPLYING CHANNEL STATUS INFORMATION BASED ON ORTHOGONAL FREQUENCY DIVISION MULTIPLEXING

(76) Inventor: Hong Seok Seo, Gyeonggi-do (KR)

(*) Notice: Subject to any disclaimer, the term of this patent is extended or adjusted under 35 U.S.C. 154(b) by 375 days.

(21) Appl. No.: 12/842,503

(22) Filed: Jul. 23, 2010

(65) Prior Publication Data

US 2011/0026644 A1 Feb. 3, 2011

Related U.S. Application Data

(60) Provisional application No. 61/230,670, filed on Jul. 31, 2009.

(51) Int. Cl.
*H04K 1/10* (2006.01)
*H04L 27/06* (2006.01)

(52) U.S. Cl.
USPC .................. 375/340; 375/260; 375/341

(58) Field of Classification Search .......... 375/260, 375/340, 341
See application file for complete search history.

(56) References Cited

U.S. PATENT DOCUMENTS 7,359,311 B1 * 4/2008 Paranjpe et al. ............. 370/203
2004/0071229 A1 * 4/2004 Collins .......................... 375/340

* cited by examiner

*Primary Examiner* — Shuwang Liu
*Assistant Examiner* — Ross Varndell
(74) *Attorney, Agent, or Firm* — Rabin & Berdo, P.C.

(57) ABSTRACT

A method applies channel status information (CSI) to a soft-decided signal. The method performs adjustment suitable for a soft-decided and received signal in applying pre-estimated CSI to a decoder, thereby enhancing performance and enabling adaptive application. The method includes calculating a second value $CSI_{NEW}$ for enhancing reliability of a received first CSI $CSI_{RECEIVED}$, and applying a weight value to the calculated second CSI value $CSI_{NEW}$ to calculate a third CSI value $CSI_{WEIGHTED}$; applying the third CSI value $CSI_{WEIGHTED}$ to a first soft-decision value $S_{SOFTDECISION}$ of an actually-received signal to calculate a second soft-decision value $S_{SOFTDECISION+CSI}$ adjusted; and restrictedly controlling an output range of the calculated second soft-decision value $S_{SOFTDECISION+CSI}$ to obtain a third soft-decision value $S_{SOFTDECISION+CSI\_Bounded}$.

5 Claims, 4 Drawing Sheets

METHOD FOR PROCESSING RECEIVED SIGNAL BY APPLYING CHANNEL STATUS INFORMATION BASED ON ORTHOGONAL FREQUENCY DIVISION MULTIPLEXING

TECHNICAL FIELD

The present invention relates to a signal receiving method based on Orthogonal Frequency Division Multiplexing (OFDM), and in particular, to a method for processing received signal by applying channel status information based on OFDM, which estimates and adjusts Channel Status Information (CSI), newly calculates CSI by applying a weight value, and enhances the reception performance of a receiver by applying the calculated CSI to a received signal.

BACKGROUND

In the case of a multi-carrier transmission scheme based on OFDM, the effects of transmission channels on carriers that are allocated for each frequency differ by carriers. Due to this reason, a receiving side estimates each channel status with a signal that is transmitted through each carrier, and represents the estimated information as a certain value to refer to the information as CSI. Since the usability of the CSI estimated by the receiving side through the above-described operation is diverse, a method has been proposed where in the case of wireless communication, a receiving side retransmits CSI to a transmitting side and the transmitting side may enable the transmission of a transmitted signal that is adjusted on the basis of the retransmitted CSI, and when it is impossible to retransmit CSI like wireless broadcasting, received information may more accurately be decoded by using the estimated CSI in adjusting the error of a received signal. The present invention proposes a method that requires a smaller memory capacity and simpler hardware configuration than the existing method, in a case where a receiving side uses a received signal as additional adjustment information for decoding in the above-described method for using CSI.

FIG. 1 is a block diagram illustrating a typical decoder transfer apparatus for CSI and soft-decided signal. As a method of using CSI for more accurate decoding, a method is used which transfers a CSI value estimated and a soft-decided signal received to a decoder and applies them to the decoder.

Typical technologies have been disclosed in U.S. Pat. No. 7,492,830, U.S. Pat. No. 7,272,294 and U.S. Pat. No. 5,313,495.

To provide a more detailed description on the typical technologies, for example, a method will be described below for enhancing the decoding performance of a viterbi decoder well-known as a representative decoder by using CSI.

To provide a description on the internal structures of most typical receivers for easy understanding, the viterbi decoder is not disposed at the direct rear end of a soft-decision block for an actually-received signal but is disposed at the rear ends of several function blocks based on a memory.

The above-described typical technology should process a function block using a memory device such as a de-interleaver that exists between the viterbi decoder and a soft-decision block for a received signal for transferring the received signal and CSI to the viterbi decoder. In this case, an additional memory is required for storing CSI, and moreover, the speed of a clock for transmitting the received signal and CSI should be higher.

Furthermore, the typical method cannot appropriately perform adjustment suitable for a soft-decided signal in applying pre-estimated CSI to a decoder.

SUMMARY

Accordingly, the present invention provides a method for processing received signal by applying channel status information based on OFDM, which applies CSI to a soft-decided signal and thus can more enhance performance than a method applied to a typical decoder even without using an additional memory and the increase of a clock speed.

The present invention also provides a method for processing received signal by applying channel status information based on OFDM, which appropriately perform adjustment suitable for a soft-decided and received signal in applying pre-estimated CSI to a decoder, thereby more enhancing performance and enabling adaptive application based on the change of a channel status.

According to an aspect, there is provided a method for processing received signal by applying channel status information based on OFDM, including: performing a first operation of calculating a new second Channel Status Information (CSI) value $CSI_{NEW}$ for enhancing reliability of a received first CSI $CSI_{RECEIVED}$, and applying a weight value to the calculated new second CSI value $CSI_{NEW}$ to calculate a third CSI value $CSI_{WEIGHTED}$; performing a second operation of applying the third CSI value $CSI_{WEIGHTED}$ having the weight value to a first soft-decision value $S_{SOFTDECISION}$ of an actually-received signal to calculate a second soft-decision value $S_{SOFTDECISION+CSI}$ adjusted; and performing a third operation of restrictedly controlling an output range of the calculated second soft-decision value $S_{SOFTDECISION+CSI}$ to finally obtain a third soft-decision value $S_{SOFTDECISION+CSI\_Bounded}$ calculated.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Figure 1:
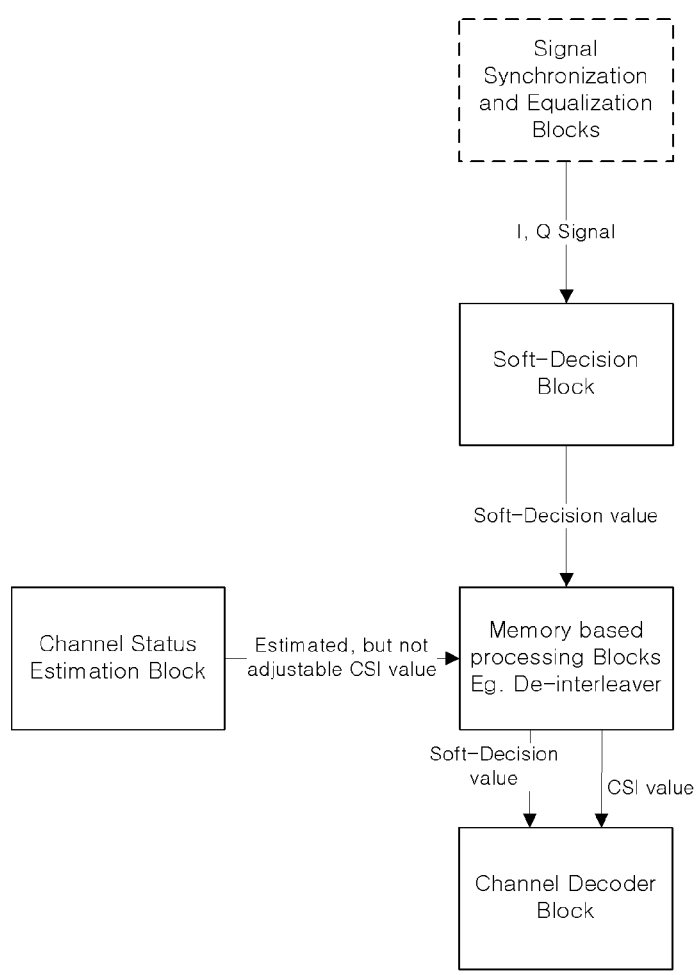
FIG. 1 is a block diagram illustrating a typical decoder transfer apparatus for CSI and soft-decided signal.

Hereinafter, the present invention will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A method for processing received signal by applying channel status information based on OFDM according an embodiment of the present invention will be described below in more detail with reference to FIGS. 2 to 4.

Figure 2:
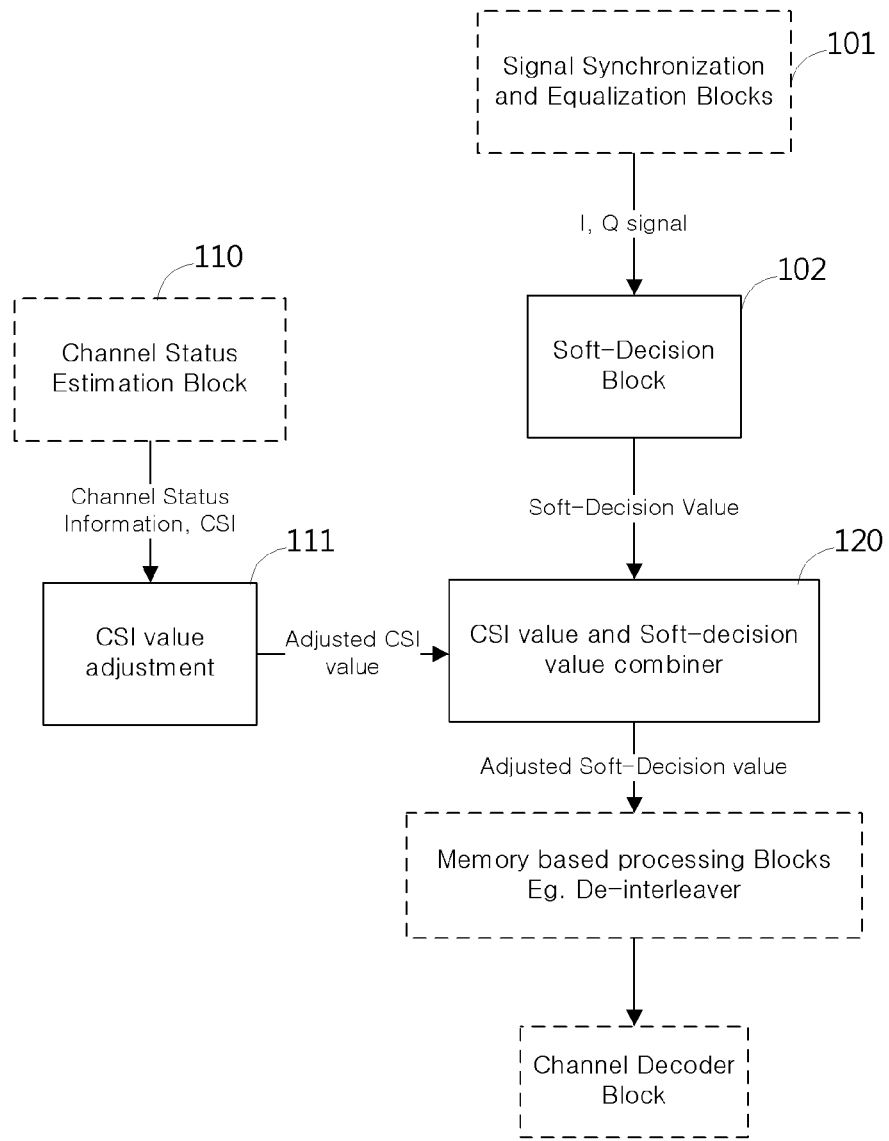
FIG. 2 is a block diagram for describing a method for processing received signal by applying channel status information based on OFDM according to an embodiment of the present invention.

FIG. 2 is a block diagram for describing a method for processing received signal by applying channel status information based on OFDM according to an embodiment of the present invention.

Referring to FIG. 2, a channel status estimation block 110 estimates a first CSI value. A CSI value adjustment block 111 calculates a second CSI value $CSI_{NEW}$ that is obtained by adjusting the first CSI value $CSI_{RECEIVED}$, and a third CSI value $CSI_{WEIGHTED}$ to which a weight value is given. A soft-decision block 102 calculates a first soft-decision value from received I and Q signals that are demodulated into an in-phase (I) signal and a quadrature-phase (Q) signal through a signal synchronization and equalization block 101. A CSI value and soft-decision value combiner 120 applies the third CSI value $CSI_{WEIGHTED}$ which is calculated by the CSI value adjustment block 111 to the soft-decided first soft-decision value $S_{SOFTDECISION}$ of an actually-received signal to calculate a second soft-decision value $S_{SOFTDECISION+CSI}$, restrictedly controls the output range of the second soft-decision value $S_{SOFTDECISION+CSI}$ to finally obtain a third soft-decision value $S_{SOFTDECISION+CSI\_Bounded}$, and transmit the third soft-decision value $S_{SOFTDECISION+CSI\_Bounded}$ to a channel decoder.

First, a scheme of transferring estimated CSI which is applied to an embodiment of the present invention will be defined and determined The CSI value may be a value from a minimum of 0 to an arbitrary number N having a maximum of positive value. Herein, it is assumed that the estimated value of the best channel status is 0, and the estimated value of the worst channel status is N. However, the application of CSI that is described in an embodiment of the present invention is irrelevant to the definition, which is merely used for easy representation and understanding.

Furthermore, since actual hardware configuration transfers information by using only a binary number, actual configuration uses only positive and negative integers. By this reason, an embodiment of the present invention will be described below based on positive and negative integers.

Based on such an assumption, a CSI value is applied to the actual soft-decision value of a received signal by using received CSI through a method according to an embodiment of the present invention.

The CSI value adjustment block 111 adjusts the first CSI value $CSI_{RECEIVED}$ that is received from the channel status estimation block 110 and applies a weight value to calculate the second CSI value $CSI_{NEW}$.

Figure 3:
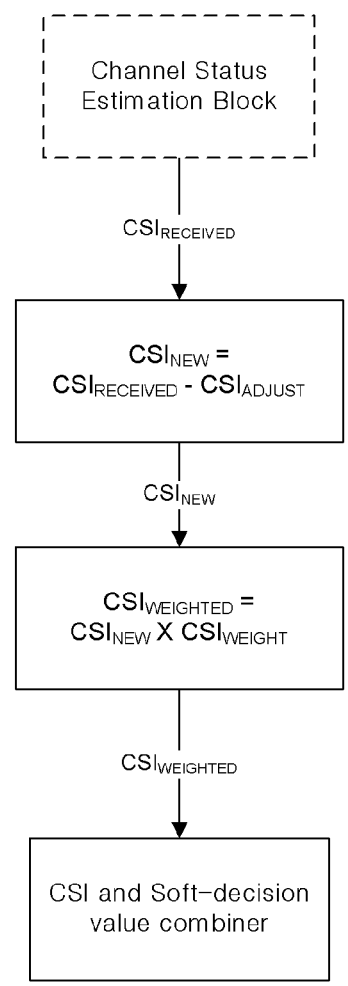
FIG. 3 is a detailed flowchart illustrating an operation which adjusts CSI and applies a weight value in a CSI value adjustment block of FIG. 2.
Figure 4:
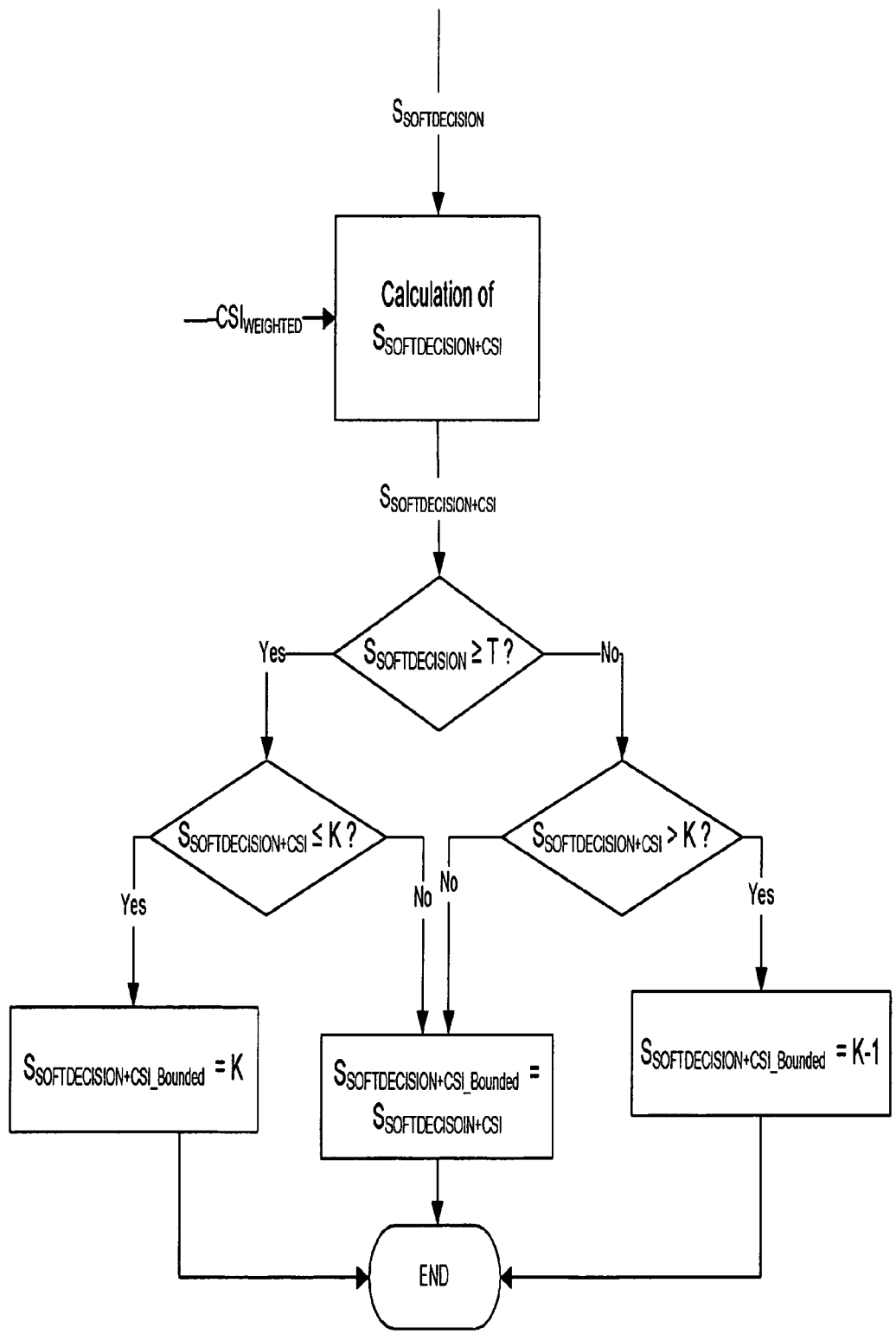
FIG. 4 is a flowchart illustrating an operation which applies CSI, to which a weight value is applied in FIG. 2, to a soft-decision value and restricts a range of a final signal according to the applied result.

FIG. 3 is a detailed flowchart illustrating an operation which adjusts CSI and applies a weight value in the CSI value adjustment block 111 of FIG. 2. The CSI value adjustment block 111 performs a CSI adjustment value applying operation that adjusts the first CSI value $CSI_{RECEIVED}$ that is received from the channel status estimation block 110 and a CSI weight value applying operation that applies a weight value to the first CSI value $CSI_{RECEIVED}$.

First, the reliability of the first CSI value $CSI_{RECEIVED}$ is unclear, and thus for controlling this, the CSI adjustment value applying operation re-controls a CSI value by adding a certain amount to the current first CSI value $CSI_{RECEIVED}$ or subtracting a certain amount from the current first CSI value $CSI_{RECEIVED}$. As a result, the new second CSI value $CSI_{NEW}$ is calculated through Equation (1) below.

$$CSI_{NEW} = CSI_{RECEIVED} - CSI_{ADJUST} \quad (1)$$

where $CSI_{NEW}$ is a newly-calculated second CSI value, $CSI_{RECEIVED}$ is a first CSI value that is actually received from the channel status estimation block 110, and $CSI_{ADJUST}$ is an arbitrary value. Since the arbitrary value may be appropriately selected through experiment, detailed description on the optimal method for this will be omitted.

Next, the CSI weight value applying operation enlarges or reduces the newly-calculated second CSI value $CSI_{NEW}$ to an appropriate size. In this way, the CSI weight value applying operation may control a weight value that is applied to a CSI value depending on requirements. As a result, the third CSI value $CSI_{WEIGHTED}$ applying a weight value is calculated through Equation (2) below.

$$CSI_{WEIGHTED} = CSI_{NEW} \times CSI_{WEIGHT} \quad (2)$$

where third CSI value $CSI_{WEIGHTED}$ is a value that is obtained by multiplying the second CSI value $CSI_{NEW}$ calculated through Equation (1) and a weight value $CSI_{WEIGHT}$. Herein, the weight value $CSI_{WEIGHT}$ is an arbitrary value. Since the arbitrary value may be appropriately selected through experiment, detailed description on this will be omitted.

In this way, an operation is divided into an operation where the CSI value and soft-decision value combiner 120 applies the calculated third CSI value $CSI_{WEIGHTED}$ to the soft-decided first soft-decision value $S_{SOFTDECISION}$ of an actually-received signal to calculate the second soft-decision value $S_{SOFTDECISION+CSI}$, and an operation that restrictedly controls the final output range of the calculated second soft-decision value $S_{SOFTDECISION+CSI}$ to control the third soft-decision value $S_{SOFTDECISION+CSI\_Bounded}$ calculated.

First, as expressed in Equation (3), an operation of calculating the second soft-decision value $S_{SOFTDECISION+CSI}$ applies the calculated third CSI value $CSI_{WEIGHTED}$ to a first soft-decision value of a received signal that is calculated by the existing soft-decision block.

if $S_{SOFTDECISION} \geq T$, $S_{SOFTDECISION+CSI} = S_{SOFTDECISION} - CSI_{WEIGHTED}$ else $S_{SOFTDECISION+CSI} = S_{SOFTDECISION} + CSI_{WEIGHTED}$ \quad (3)

where T has a value where probability that a soft-decided value is determined as a binary number of 0 is the same as probability that the soft-decided value is determined as a binary number of 1, and may be changed depending on requirements. Since a detailed operation of selecting T has been well known, detailed description on this will be omitted.

Next, an operation of restrictedly controlling the final output range of the second soft-decision value $S_{SOFTDECISION+CSI}$ applying the third CSI value $CSI_{WEIGHTED}$ is expressed as Equation (4) below.

if $S_{SOFTDECISION} \geq T$ and $S_{SOFTDECISION+CSI} \leq K$, then $S_{SOFTDECISION+CSI\_Bounded} = K$ else if $S_{SOFTDECISION} < T$ and $S_{SOFTDECISION+CSI} > K$,
then $S_{SOFTDECISION+CSI\_Bounded} = K-1$ \quad (4)

where T has a value where probability that a soft-decided value by Equation (3) is determined as 0 is the same as probability that the soft-decided value by Equation (3) is determined as 1, and K has the same value as T but may be set as a value different from T depending on requirements and indicates an arbitrary integer. Since the optimal method of each value may be selected through experiment, detailed description on this will be omitted. FIG. 4 is a flowchart applying Equation (4). The first soft-decision value $S_{SOFTDECISION}$ is compared with T. The second soft-decision value $S_{SOFTDECISION+CSI}$ is compared with K, and the output limit of the second soft-decision value $S_{SOFTDECISION+CSI}$ is determined according to the compared result.

That is, when the first soft-decision value $S_{SOFTDECISION}$ is greater than or equal to T and the second soft-decision value $S_{SOFTDECISION+CSI}$ is less than or equal to K (i.e., $S_{SOFTDECISION} \geq T$ and $S_{SOFTDECISION+CSI} \leq K$), the final output $S_{SOFTDECISION+CSI\_Bounded}$ of the second soft-decision value is determined as K. When the first soft-decision value $S_{SOFTDECISION}$ is greater than or equal to T and the second soft-decision value $S_{SOFTDECISION+CSI}$ is greater than K (i.e., $S_{SOFTDECISION} \geq T$ and $S_{SOFTDECISION+CSI} > K$), the final soft-decision output value $S_{SOFTDECISION+CSI\_Bounded}$ is determined as the second soft-decision value $S_{SOFTDECISION+CSI}$.

On the other hand, when the first soft-decision value $S_{SOFTDECISION}$ is less than T and the second soft-decision value $S_{SOFTDECISION+CSI}$ is greater than K (i.e., $S_{SOFTDECISION} < T$ and $S_{SOFTDECISION+CSI} > K$), the final output $S_{SOFTDECISION+CSI\_Bounded}$ of the second soft-decision value is determined as "K−1". When the first soft-decision value $S_{SOFTDECISION}$ is less than T and the second soft-decision value $S_{SOFTDECISION+CSI}$ is less than or equal to K (i.e., $S_{SOFTDECISION} < T$ and $S_{SOFTDECISION+CSI} \leq K$), the final soft-decision output value $S_{SOFTDECISION+CSI\_Bounded}$ is determined as the second soft-decision value $S_{SOFTDECISION+CSI}$.

The method for processing received signal by applying channel status information based on OFDM according to an embodiment of the present invention applies CSI to a soft-decided signal and thus can more enhance performance than a method applied to a typical decoder even without using an additional memory and the increase of a clock speed.

The method for processing received signal by applying channel status information based on OFDM according to an embodiment of the present invention appropriately perform adjustment suitable for a soft-decided and received signal in applying pre-estimated CSI to a decoder, thereby more enhancing performance and enabling adaptive application based on the change of a channel status.

The method for processing received signal by applying channel status information based on OFDM according to an embodiment of the present invention restricts the final output range of a soft-decided signal to which CSI is applied, and thus can prevent an error that may be caused by the application of an actual CSI value. Moreover, a soft-decision value applying CSI can be applied irrespective of the kinds of decoders.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for processing received signal by applying channel status information based on Orthogonal Frequency Division Multiplexing (OFDM), the method comprising:

performing a first operation of calculating a new second Channel Status Information (CSI) value $CSI_{NEW}$ for enhancing reliability of a received first CSI $CSI_{RECEIVED}$, and applying a weight value to the calculated new second CSI value $CSI_{NEW}$ to calculate a third CSI value $CSI_{WEIGHTED}$;

performing a second operation of applying the third CSI value $CSI_{WEIGHTED}$ having the weight value to a first soft-decision value $S_{SOFTDECISION}$ of an actually-received signal to calculate a second soft-decision value $S_{SOFTDECISION+CSI}$ adjusted; and performing a third operation of restrictedly controlling an output range of the calculated second soft-decision value $S_{SOFTDECISION+CSI}$ to finally obtain a third soft-decision value $S_{SOFTDECISION+CSI\_Bounded}$ calculated;

wherein in the second operation, by applying the first soft-decision value $S_{SOFTDECISION}$ and the third CSI value $CSI_{WEIGHTED}$ applying the weight value which is calculated in the first operation, the second soft-decision value $S_{SOFTDECISION+CSI}$ is calculated through the following equation, if $S_{SOFTDECISION} \geq T$, $S_{SOFTDECISION+CSI} = S_{SOFTDECISION} - CSI_{WEIGHTED}$ else $S_{SOFTDECISION+CSI} = S_{SOFTDECISION} + CSI_{WEIGHTED}$ where $S_{SOFTDECISION}$ is a first soft-decision value of a received signal which is calculated by a soft-decision block, and T has a value where probability that a soft-decision value is determined as a binary number of 0 or 1 is the same and is changed depending on requirements.

2. The method of claim 1, wherein in the first operation, the new second CSI value $CSI_{NEW}$ is calculated through the following equation, $CSI_{NEW} = CSI_{RECEIVED} - CSI_{ADJUST}$ where $CSI_{RECEIVED}$ is a first CSI value which is actually received from a channel status estimation block, and $CSI_{ADJUST}$ is an arbitrary value.

3. The method of claim 1, wherein in the first operation, the third CSI value $CSI_{WEIGHTED}$ applying the weight value is calculated through the following equation, $CSI_{WEIGHTED} = CSI_{NEW} \times CSI_{WEIGHT}$ where $CSI_{NEW}$ is a second CSI value which is obtained from a channel status adjustment block, and $CSI_{WEIGHT}$ is an arbitrary value.

4. The method of claim 1, wherein the third operation restrictedly controls the final output range of the second soft-decision value $S_{SOFTDECISION+CSI}$ to finally obtain the third soft-decision value $S_{SOFTDECISION+CSI\_Bounded}$ through the following equation, if $S_{SOFTDECISION} \geq T$ and $S_{SOFTDECISION+CSI} \leq K$, then $S_{SOFTDECISION+CSI\_Bounded} = K$ else if $S_{SOFTDECISION} < T$ and $S_{SOFTDECISION+CSI} > K$, then $S_{SOFTDECISION+CSI\_Bounded} = K-1$ where $S_{SOFTDECISION}$ is a first soft-decision value of a received signal which is calculated by a soft-decision block, and T has a value where probability that a soft-decision value is determined as a binary number of 0 or 1 is the same, and K is the same value as T or an arbitrary value different from T.

5. The method of claim 1, wherein the third operation restrictedly controls the final output range of the second soft-decision value $S_{SOFTDECISION+CSI}$ to finally obtain the third soft-decision value $S_{SOFTDECISION+CSI\_Bounded}$ through the following equation, if $S_{SOFTDECISION} \geq T$ and $S_{SOFTDECISION+CSI} \leq K$, then $S_{SOFTDECISION+CSI\_Bounded} = K$ else if $S_{SOFTDECISION} < T$ and $S_{SOFTDECISION+CSI} > K$, then $S_{SOFTDECISION+CSI\_Bounded} = K-1$ where $S_{SOFTDECISION}$ is a first soft-decision value of a received signal which is calculated by a soft-decision block, and T has a value where probability that a soft-decision value is determined as a binary number of 0 or 1 is the same, and K is the same value as T or an arbitrary value different from T.

\* \* \* \* \*